May 31, 1932. H. E. LAKE 1,861,017
ANTISIPHON VALVE
Filed May 29, 1929
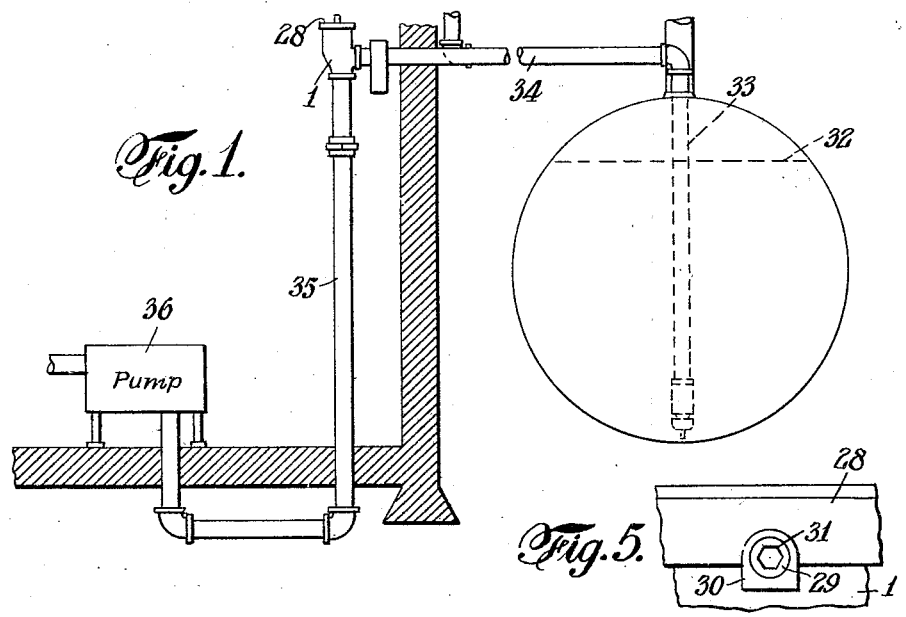
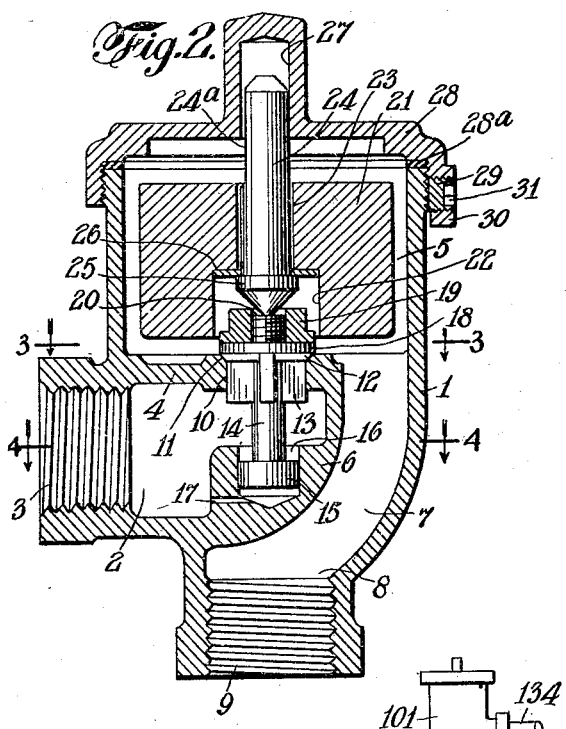
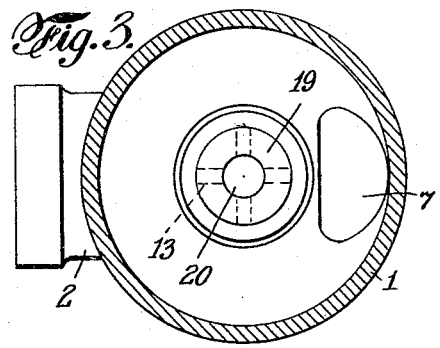
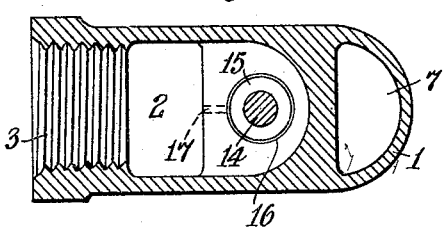
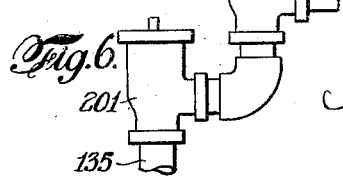
INVENTOR
Harry E. Lake
BY Louis Prevost Whitaker
ATTORNEY Patented May 31, 1932

1,861,017

UNITED STATES PATENT OFFICE

HARRY E. LAKE, OF NEW YORK, N. Y., ASSIGNOR TO PREFERRED UTILITIES MANUFACTURING CORPORATION, OF NEW YORK, N. Y., A CORPORATION OF DELAWARE

ANTISIPHON VALVE

Application filed May 29, 1929. Serial No. 367,046.

My invention consists in the novel features hereinafter described, reference being had to the accompanying drawings, which illustrate one embodiment of the same, selected by me for purposes of illustration, and the said invention is fully disclosed in the following description and claims.

The object of my invention is to provide an anti-siphon valve adapted for use in a pipe line for withdrawing liquid from a tank or containing receptacle in which the liquid level is located above the point to which the liquid is delivered, by means of a feed pump or other suction means, to prevent the liquid from being withdrawn from the containing tank or receptacle, in case of a break in the pipe line, or failure of suction for any other reason. My anti-siphon valve has been employed extensively in fuel oil lines delivering fuel oil to burners for furnaces and the like, but may be employed wherever its use may be found advantageous or desirable, and the embodiment herein shown is constructed in full accordance with the specifications of the fire underwriters of the United States.

In carrying out my invention I provide a valve casing provided with inlet and outlet apertures having their axes at an angle of 90 degrees to each other, and provided with standard threads, so that it can be inserted in the pipe line to take the place of an ordinary elbow. The casing is provided with a valve seat and valve for closing communication between the inlet and outlet, the valve being held seated by a weight, instead of a spring, so that the pressure on the valve is uniform and is not increased by the opening of the valve, and the weight is flexibly connected to the valve to avoid straining or bending the valve or its stem in shipment or handling. The valve is also provided with a dash-pot to prevent chattering.

The valve can also be conveniently used in series when the vertical distance from the liquid level in the containing receptacle to the level of the point of discharge is unusually great, so that the valve can be made in standard size for any standard pipe with which it is to be employed.

Referring to the accompanying drawings, which show one embodiment of my invention, selected by me for purposes of illustration, Fig. 1 represents diagrammatically a conventional installation of a fuel oil tank to a pump or burner showing my anti-siphon valve inserted in the pipe line.

Fig. 2 is an enlarged vertical sectional view of the anti-siphon valve.

Fig. 3 is a horizontal section on line 3—3 of Fig. 2.

Fig. 4 is a horizontal section on line 4—4 of Fig. 2.

Fig. 5 is a detail showing the locking screw for the cover.

Fig. 6 is a detail showing a convenient arrangement of installing the valves in series when desired.

In the drawings, 1, represents the casing or body of the anti-siphon valve, which is provided with a horizontal inlet passage, 2, interiorly threaded, as at 3, and separated by a horizontal interior partition, 4, from a cylindrical weight chamber, 5, above the same, and by a curved partition, 6, from a curved passage, 7, communicating at its upper end with the weight chamber, 5, and at its lower end with the outlet passage, 8, interiorly threaded, as at 9. The horizontal partition, 4, is provided with an aperture, 10, connecting the inlet passage, 2, with the weight chamber and surrounded by a valve seat, 11. The valve, which moves vertically with respect to the seat, in this instance comprises a metal body, 12, having the usual guiding web, 13, to engage the aperture, 10, and provided with a downwardly extending stem, 14, having a piston, 15, at its lower end fitting easily in a cylindrical coaxial recess, 16, formed in the partition, 6, and connected at its lower end by a vent passage, 17, of reduced diameter, with the inlet passage, 2, and forming with the piston, 15, a dash-pot to prevent the valve from chattering. In this instance the valve proper is formed by a ring, 18, of suitable material, which will make a tight joint when seated, but will not be injuriously affected by the liquid, which ring is clamped to the metal body of the valve by a clamping device, 19, connected to the metal body, 12, by a threaded engagement therewith. This arrangement permits the ring, 18, to be renewed when it becomes worn. The upper end of the valve assembly is provided with a recessed portion, indicated at 20.

21 is a weight formed of lead or other material, provided preferably with a recess in its lower end, indicated at 22, large enough to clear the valve mechanism and counterbored, as at 23, to form a central aperture which receives a stem, 24, formed preferably of brass, with an enlarged conical head, 25, at its lower end, engaging the recess, 20, and having a metal washer, 26, interposed between the head and the upper end of the recess, 22, in the weight. The stem, 24, of the weight, projects upwardly beyond the upper end of the main body of the valve casing, and projects into a guiding recess, 27, formed in a cap or cover, 28, which is screwed onto the upper end of the valve casing, a suitable washer, 28a, being interposed between the cap and the upper edge of the valve casing. The upper portion of the weight stem, 24, which reciprocates in the guiding recess, 27, of the cap or cover, is preferably constructed so as not to imprison any air in this recess, for example, by flattening the stem, as indicated at 24a, in a well known way. The cap or cover is also preferably provided with a retaining screw, 29, as indicated in Fig. 5, extending through the downwardly projecting flange of the cap or cover, and preferably through a lug, 30, formed thereon to provide additional metal, and the said screw is preferably provided with a polygonal socket, indicated at 31, to receive a special tool or key so as to prevent tampering with the valve mechanism after it has been placed in operating position.

Fig. 1 represents, diagrammatically, a conventional representation in which the anti-siphon valve is conveniently employed. In this diagram, 32, represents a tank or container for fuel oil (or other liquid) provided with a draw-off pipe, indicated in dotted lines at 33, and extending to near the bottom of the tank. This pipe is connected with a horizontal pipe, 34, with the inlet passage, 2, of the anti-siphon valve, as shown. 35 represents a downwardly extending pipe connected with the outlet passage, 8, of the anti-siphon valve and having its lower end below the liquid level in the tank, and connected to a pump (or other suction device) indicated diagrammatically at 36, for supplying a fuel burner (not shown). When the pump or other suction device is in operation, its suction will reduce the pressure in the outlet passages, 7 and 8, and the weight chamber, 5, of the anti-siphon valve, causing the valve, 18, to lift, raising the weight, 21, and permitting the liquid to flow from the tank through the valve to the pump, as will be readily understood. The recess, 16, being filled with liquid both above and below the piston, 15, the said recess and piston will act as a dash-pot to prevent the valve from chattering, and permitting liquid to be continuously withdrawn from the tank. It is obvious that as soon as the suction of the pump or other suction device ceases, the weight, 21, will cause the valve to seat and prevent any further discharge of liquid from the tank. It follows, therefore, that if the piping connected with the outlet passage of the valve should become ruptured at a point below the level of the liquid in the tank, the valve, 18, would instantly seat and the liquid would not be withdrawn from the tank by siphonic action, as would otherwise be the case. Obviously the weight, 21, must be sufficiently heavy to overcome any suction which would be created by the gravity of the liquid in the down pipe, 35, leading from the anti-siphon valve. In accordance with the requirements of the specifications of the fire underwriters, it is customary to make this weight sufficient to overcome a downward pull of liquid in a pipe, 10 feet in length and if the lowest point in the pipe line is more than ten feet below the maximum liquid level in the tank, it is obvious that greater weight would have to be provided. This may be done by making the valve mechanisms of different sizes and with different sized weights if desired, but I have found it convenient to meet this situation by using the valves in series in the manner illustrated in Fig. 6.

As therein shown, the outlet end of an anti-siphon valve of the kind previously described and indicated in this figure at 101, is connected by nipples and an elbow with the inlet passage of a second similar valve, indicated at 201. The discharge passage of this valve is connected with the down pipe indicated at 135. This would take care of an installation having a drop of double the distance compensated by a single valve, and this arrangement permits of manufacturing the valves in quantity in a standard size for the piping to be ample without making it in a plurality of sizes for each standard pipe size, as would otherwise be necessary. Obviously any number of these valves can be connected in the manner indicated in Fig. 6 to take care of an installation in which the drop from the level of liquid in the tank to the lowest point in the pipe line is a multiple of the distance which a single valve will take care of.

It will also be understood that by using a weight instead of a spring, the pressure on the valve tending to seat it is the same whether the valve is open or closed and regardless of the extent of opening of the valve, and the use of springs and adjusting screws with their consequent liability to cause trouble is entirely avoided.

It is also to be noted that the valve is entirely separate from the weight so that if the valve is laid on its side or subjected to rough handling in transportation or otherwise, movements of the weight will not injure the valve or any part connected with it, as might happen if the weight engaged a stem, rigidly connected with the valve.

What I claim and desire to secure by Letters Patent is:—

1. An anti-siphon valve comprising a valve casing having a horizontal inlet passage and a vertical outlet passage, said passages being provided with means for connecting pipe sections thereto, to enable the casing to take the place of an elbow, said casing being provided with horizontally and vertically disposed partitions interposed between the inlet and outlet passages, said horizontal partition being provided with an aperture surrounded by a valve seat, and said inlet passage being provided with a recess coaxial with the valve seat and communicating at its lower end with the inlet passage by a vent passage of reduced diameter, a valve for engaging said valve seat having a depending stem provided with a piston engaging said recess, said casing being provided with a weight chamber above the horizontally disposed partition communicating with the outlet passage, a detachable cover for said casing forming the top of the weight chamber, and provided with a guiding recess coaxial with the valve seat, a vertically movable weight stem in said weight chamber having its upper end in guiding engagement with the guiding recess in said cover and its lower end loosely engaging said valve, and a vertically movable weight in said weight chamber supported by said vertically movable weight stem for holding said valve seated against a predetermined siphonic action.

2. An anti-siphon valve comprising a valve casing having a horizontal inlet passage and a vertical outlet passage, said passages being provided with means for connecting pipe sections thereto, to enable the casing to take the place of an elbow, said casing being provided with horizontally and vertically disposed partitions interposed between the inlet and outlet passages, said horizontal partition being provided with an aperture surrounded by a valve seat, and said inlet passage being provided with a recess coaxial with the valve seat and communicating at its lower end with the inlet passage by a vent passage of reduced diameter, a valve for engaging said valve seat having a depending stem provided with a piston engaging said recess, said casing being provided with a weight chamber above the horizontally disposed partition communicating with the outlet passage, a detachable cover for said casing forming the top of the weight chamber, and provided with a guiding recess coaxial with the valve seat, a vertically movable weight stem in said weight chamber having its upper end in guiding engagement with the guiding recess in said cover and its lower end provided with a conical portion loosely engaging said valve, and a supporting shoulder above said conical portion, and a weight in said weight chamber provided with a central aperture to engage said weight stem and supported upon said shoulder thereof to hold the valve seated against a predetermined siphonic action.

In testimony whereof I affix my signature.

HARRY E. LAKE.